United States Patent [19]

Watanabe et al.

[11] Patent Number: 4,998,129
[45] Date of Patent: Mar. 5, 1991

[54] DIAPHRAGM CONTROL APPARATUS OF A CAMERA

[75] Inventors: Youji Watanabe, Sagamihara; Yoshiaki Kobayashi, Nagano, both of Japan

[73] Assignee: Olympus Optical Co., Ltd., Tokyo, Japan

[21] Appl. No.: 419,586

[22] Filed: Oct. 10, 1989

[30] Foreign Application Priority Data

Oct. 14, 1988 [JP] Japan .................................. 63-258809

[51] Int. Cl.$^5$ .......................................... G03B 7/095
[52] U.S. Cl. ...................................... 354/452; 354/455
[58] Field of Search ............... 354/452, 453, 455, 451, 354/446, 439, 437, 271.1

[56] References Cited

U.S. PATENT DOCUMENTS

| 4,299,459 | 11/1981 | Mizokami | 354/452 |
| 4,344,678 | 8/1982 | Mizokami | 354/452 |
| 4,354,748 | 10/1982 | Grimes et al. | 354/437 X |

FOREIGN PATENT DOCUMENTS

| 52-51937 | 4/1977 | Japan . |
| 58-82228 | 5/1983 | Japan . |
| 61-29824 | 2/1986 | Japan . |

Primary Examiner—W. B. Perkey
Attorney, Agent, or Firm—Frishauf, Holtz, Goodman & Woodward

[57] ABSTRACT

In a diaphragm control apparatus of a camera for opening and closing aperture blades using a stepping motor, a step-out status of the stepping motor is detected if an open detecting switch for detecting a full-open status of the aperture blades does not function after a predetermined number of drive pulses necessary for resetting the aperture blades to a full-open position are supplied to the stepping motor. Normally, the stepping motor is subjected to such a slow-up control that the continuing duration of the energizing step (pulse width of an energizing pulse) is gradually reduced from the time the motor has been activated to increase a pulse rate and a driving speed. When the step-out status is detected, the pulse rate of the energizing pulse is set constant, and the driving speed of the stepping motor thereafter is fixed to a constant low speed to provide high-torque driving, and opening the aperture blades to the full-open position. Thereafter, when the aperture is closed to a given aperture value, the slow-up control is executed again, however, the pulse width of the energizing pulse is set lower than that used before detection of the step-out status, thus increasing the driving torque.

27 Claims, 10 Drawing Sheets

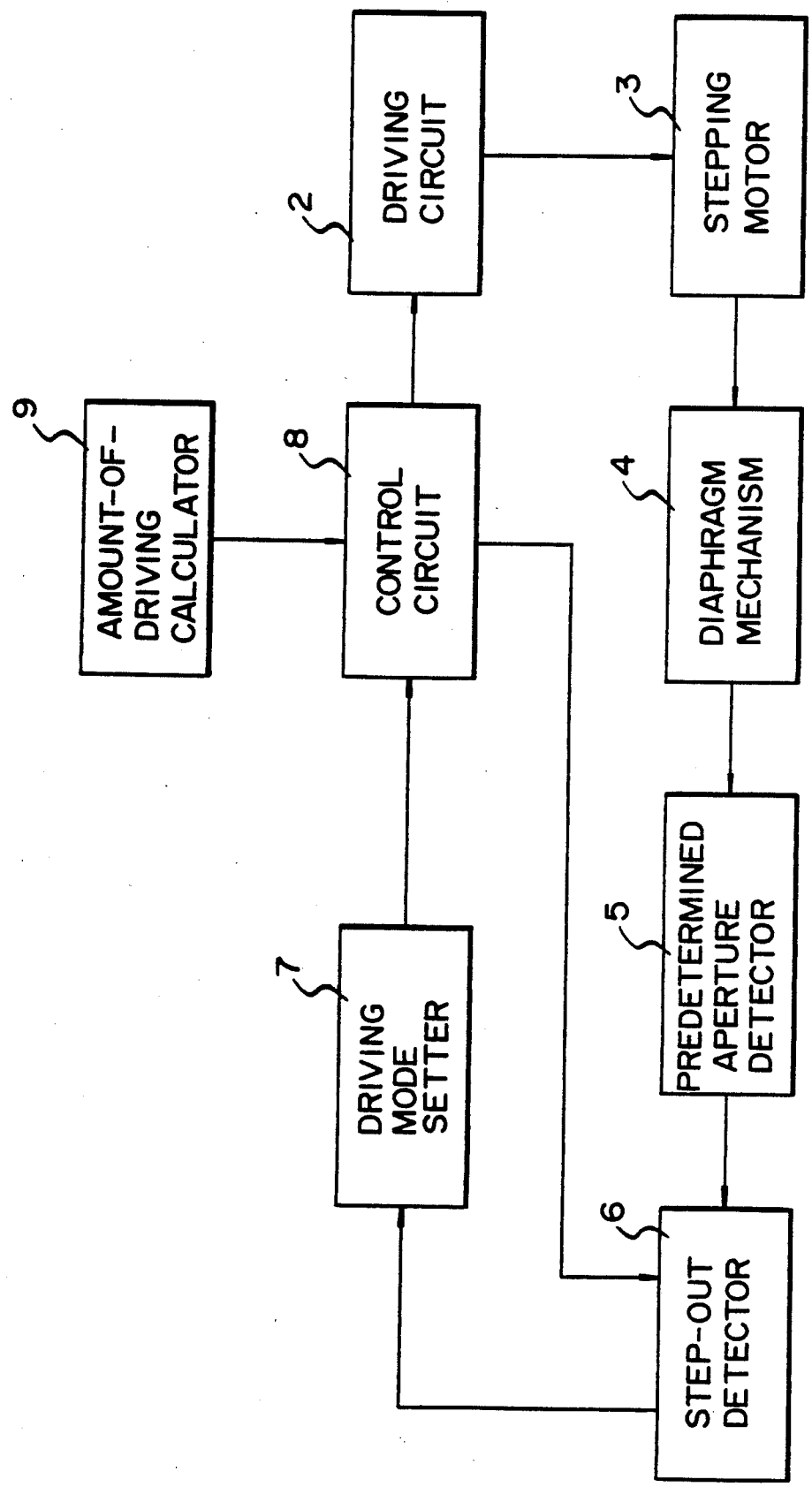
F I G. 1

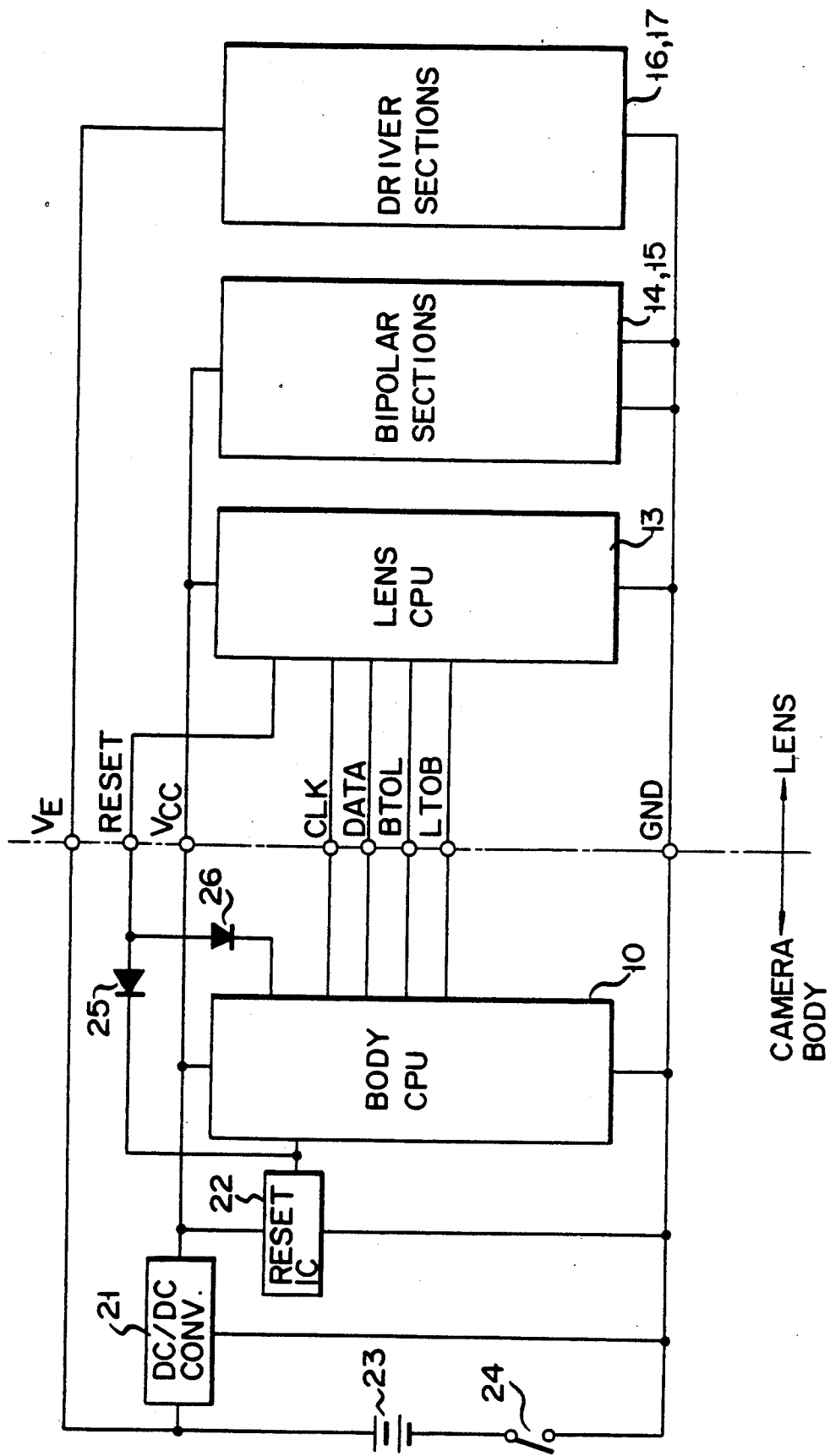
F I G. 3

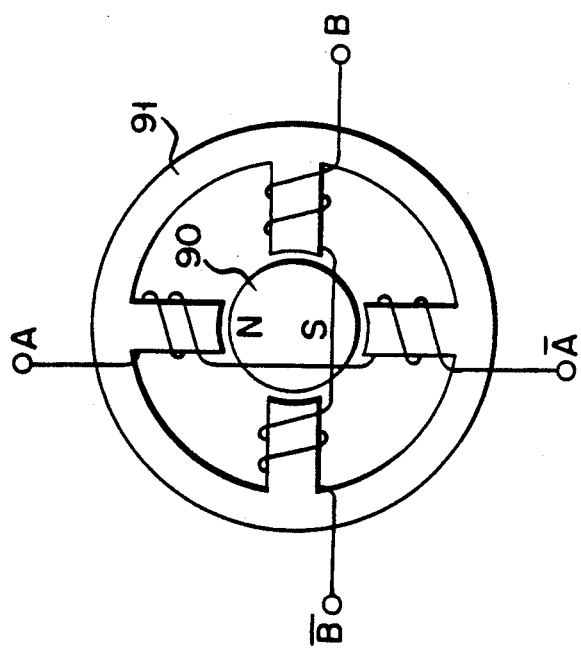
F I G. 5
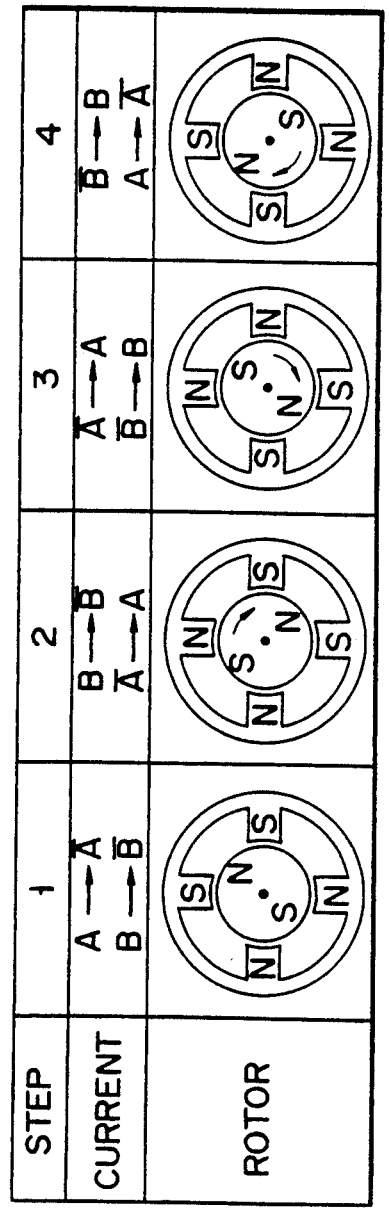
F I G. 6

DIAPHRAGM CONTROL APPARATUS OF A CAMERA

BACKGROUND OF THE INVENTION

1. Field of the Invention

The present invention relates to a diaphragm control apparatus of a camera, and, more particularly, to a diaphragm control apparatus driving a diaphragm mechanism using a stepping motor.

2. Description of the Related Art

Since a stepping motor rotates by an angle proportional to the number of input pulses, the position control for the rotor can be done by an open-loop control and without using feedback control. This can simplify the required control circuit and results in a low-cost diaphragm control apparatus. Prior art which employs such a stepping motor for controlling the diaphragm of a camera is disclosed in, for example, Japanese Patent Disclosures No. 52-51937 and No. 58-82228 and U.S. Pat. Nos. 4,299,459 and 4,344,678.

Although not disclosed in these documents, there is a big problem in using a stepping motor which is originated from a step-out or out-of-step phenomenon. The step-out phenomenon is such that a load torque becomes greater than a driving torque of a stepping motor so that the rotor cannot follow a change in excitation of the stator, thus stopping the motor.

In a diaphragm control apparatus using a stepping motor, the step-out phenomenon is likely to occur when the load torque of a diaphragm mechanism locally or entirely increases due to a change in operational atmospheric conditions or when a battery voltage rapidly drops at the time of continuous photographing or under a low temperature, sot hat a sufficient exciting current for driving the motor cannot be supplied. Upon occurrence of the step-out phenomenon, the diaphragm stays stopped down or its movement stops in the middle of action, thus disabling a TTL type auto focus or deviating the brightness at the time of full-open photometry from the proper value as well as inhibiting the subsequent photographic operation.

SUMMARY OF THE INVENTION

Accordingly, it si an object of this invention to provide a diaphragm control apparatus of a camera using a stepping motor, which detects a step-out status of the stepping motor with a simple structure, forcibly resets the diaphragm mechanism to the initial aperture position after occurrence of a step-out phenomenon for recovering the stepping motor from the step-out status to a normal status, increases the driving torque of the stepping motor in the subsequent stop-down operation to thereby prevent re-occurrence of a step-out phenomenon, thus minimizing the influence of the step-out phenomenon on a photographing operation.

A diaphragm control apparatus according to the present invention comprises a diaphragm mechanism for adjusting an intensity of light reaching a film, a stepping motor for driving the diaphragm mechanism, a calculator circuit for obtaining the amount of driving of the stepping motor necessary to fully open the diaphragm mechanism, a full-open detecting switch for detecting that the diaphragm mechanism is fully opened, a step-out detector for detecting a step-out status of the stepping motor if the full-open detecting switch does not detect the diaphragm is fully opened after the stepping motor is driven in accordance the amount of driving obtained by the calculation circuit, and a driving circuit for determining a drive mode of the stepping motor based on an output of said step-out detector and driving the stepping motor in accordance with the drive mode determined.

BRIEF DESCRIPTION OF THE DRAWINGS

FIG. 1 is a schematic block diagram illustrating a first embodiment of a diaphragm control apparatus according to the present invention;

FIG. 3 illustrates a power source system and a communication line between a camera body and a lens;

FIG. 5 illustrates the structure of a stepping motor;

FIG. 6 illustrates the energization steps of the stepping motor;

FIGS. 8 through 11 are flowcharts for illustrating the operation of a lens CPU, in which:

FIG. 8 is a flowchart for a subroutine "AVSET";

FIG. 9 is a flowchart for a subroutine "AVOPEN";

FIG. 10 is a flowchart for a subroutine "AVRST"; and

FIG. 11 is a flowchat for a subroutine "PULSE WIDTH CONTROL"; and

DETAILED DESCRIPTION OF THE PREFERRED EMBODIMENTS

Figure 2:
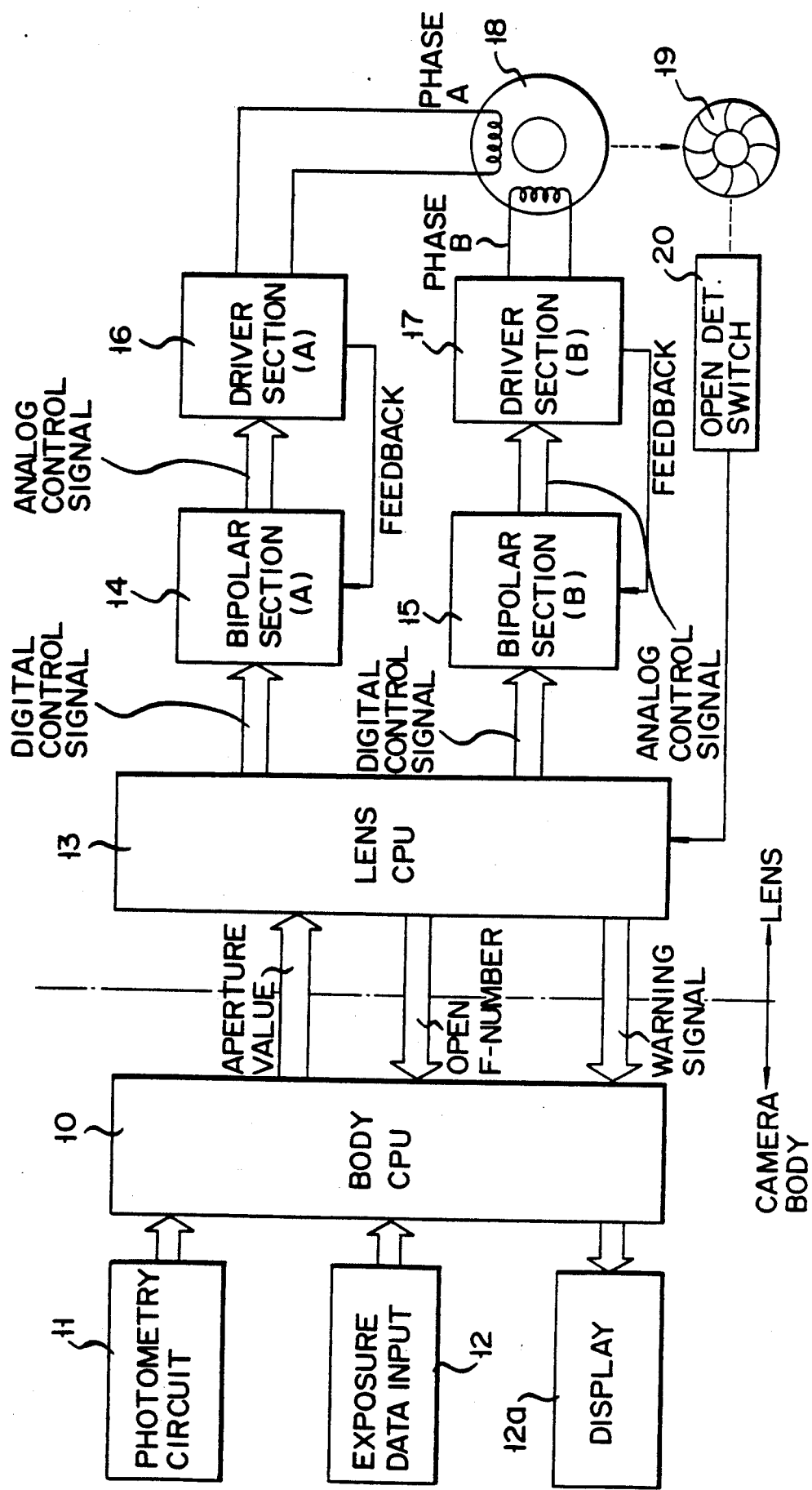
FIG. 2 is a block diagram illustrating a second embodiment of a diaphragm control apparatus according to the present invention.

Preferred embodiments of this invention will now be described with reference to the accompanying drawings. FIG. 1 is a schematic block diagram illustrating the structure of the first embodiment. The entire diaphragm control operation is controlled by signals form a control circuit 8. The control circuit 8 is coupled to an amount-of-driving calculator 9 for determining the amount of driving of a stepping motor, i.e., the number of step-rotations, necessary to change an aperture value to a desired value. A diaphragm mechanism 4 including aperture blades is driven by a stepping motor 3, which is controlled via a driving circuit 2 by the control circuit 8. The control circuit 8 sends a number of step control pulses which correspond in number to the value of the signal from the calculator 9, to the driving circuit 2. A predetermined aperture detector 5 outputs a predetermined aperture signal when the aperture value of the aperture blades reaches a predetermined value. At a time the control circuit 8 drives the aperture blades until the predetermined value is obtained, the predetermined aperture signal sometimes is not output even when a predetermined number of step control pulses are supplied to the stepping motor 3. If such is the case, it is considered that a step-out phenomenon has occurred. It is a step-out detector 6 which detects the occurrence of such a step-out phenomenon and outputs a step-out signal. A driving mode setter 7 stores the step-out signal upon reception thereof, and sets such a driving mode as to increase the driving torque of the stepping motor 3 in order to recover the stepping motor 3 from the step-out status to the normal status and to prevent re-occurrence of the step-out phenomenon. The setter 7 then informs the control circuit 8 of the driving mode.

According to this embodiment, if the predetermined aperture detector 5 does not detect a predetermined aperture value after a necessary number of step control pulses for realizing the predetermined aperture value are supplied to the stepping motor 3, it can be discriminated that the stepping motor 3 is not following the step control pulses and a step-out phenomenon has occurred. Thereafter, the step-out status of the stepping motor is returned to the normal status to prevent re-occurrence of the step-out phenomenon by increasing the driving torque of the stepping motor.

FIG. 2 is a block diagram illustrating the general structure of the second embodiment. The embodiment has a basic structure that the aperture value is determined by a camera body, and it is, when transferred to the lens, realized by a control circuit in the lens.

A part of the diaphragm control apparatus which is provided in the camera body comprises a body CPU 10, a photometry circuit 11, an exposure data input circuit 12 for manually setting an aperture value, a shutter speed, a film sensitivity, an exposure compensation value, etc., and a display 12a for informing a photographer of occurrence of a step-out phenomenon. The display 12a is usually disposed within a finder. When the lens is mounted to the camera body, the body CPU 10 is coupled to a lens CPU 13 at a mount contact (not shown). The body CPU 10 reads data about the aperture value (f-number) of the currently-mounted lens, such as minimum aperture value or full-open aperture value, from the lens CPU 13 as well as signals from the photometry circuit 11 and exposure data input circuit 12 to thereby calculate an aperture value that should be realized. The calculated aperture value is sent, as aperture data set by the camera body, to the lens CPU 13. The body CPU 10 activates the display 12a upon reception of a step-out warning signal from the lens CPU 13.

A part of the aperture control apparatus which is provided in the lens comprises a stepping motor 18 for opening and closing aperture blades 19, bipolar sections 14 and 15, driver sections 16 and 17, a full-open detecting switch (AV switch) 20, which monitors the position of the aperture blades, is normally ON and is rendered OFF when the monitored position reaches a specific aperture value, in this case, a full-open aperture value, and the lens CPU 13. Since the stepping motor 18 is of a two-phase system, the driving circuit formed of the bipolar sections and driver sections has a system for a phase A and a system for a phase B. The bipolar sections 14 and 15 respectively perform analog control of the driver sections 16 and 17 based on the control signal (digital signal) from the lens CPU 13. Accordingly, the driver sections 16 and 17 supply step control currents to the stepping motor 18 for exciting the stator. The values of the currents are always fed back to the bipolar sections 14 and 15, thus preventing a greater current than necessary from flowing in the stepping motor 18.

A detailed description of each section in FIG. 2 will be given below. As this invention is directed to an improvement of a diaphragm control apparatus using a stepping motor, functional descriptions of the photometry circuit 11 and exposure data input circuit 12 in the camera body and a description of the program sequences of the calculation of the aperture value and exposure control done by the body CPU 10 will be omitted, and the circuit for actually driving the diaphragm mechanism and its operational sequence will be mainly discussed below.

FIG. 3 illustrates a power source system and communication lines between the camera body and lens. Closing a main switch 24 supplies a source voltage $V_E$ form a battery 23 to activate a dC/DC converter 21, so that a constant voltage $V_{CC}$ of 5.5 V is supplied to the lens CPU 13 and bipolar sections 14 and 15 through the body CPU 10, a reset IC 22 and the mount contact. The reset IC 22 serves to prevent the body CPU 10 and lens CPU 13 from malfunctioning at a transient time during which the constant voltage $V_{CC}$ changes to 5.5 V from the source voltage $V_E$, and thus outputs a reset signal to hold the two CPUs 10 and 13 reset until $V_{Cc}$ becomes stable. Diodes 25 and 26 constitutes an OR gate for permitting both of the reset IC 22 and body CPU 10 to reset the lens CPU 13.

Data communication between the body CPU 10 and lens CPU is executed via four communication lines CLK (clock), DATA (data), BTOL (for a body-to-lens control signal) and LTOB (for a lens-to-body control signal). Data to be communicated includes a full-open aperture value, step-out warning signal and the set aperture value data, the former two being sent from the lens CPU 13 to the body CPU 10, and the last data from the body CPU 10 to the lens CPU 13. The clock CLK at the time of communication is sent from the lens CPU 13, and data is transmitted/received in synchronism with this clock. The BTOL and LTOB lines are used for a handshake control at the time of communication. These communication lines are normally at an "H" level and become an "L" level when active.

Figure 4:
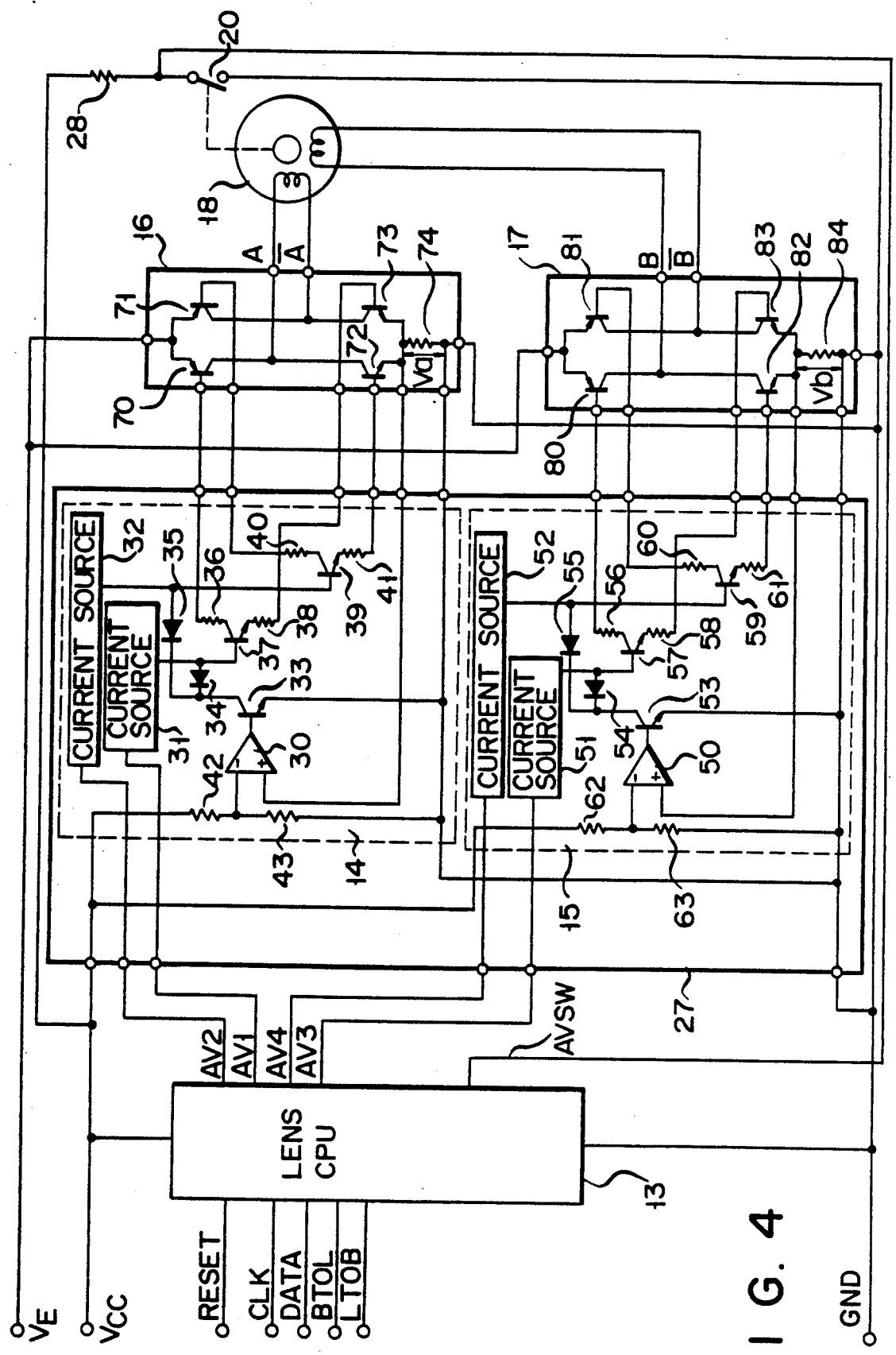
FIG. 4 is a detailed circuit diagram illustrating a driving circuit for a stepping motor.

FIG. 4 illustrates in detail the bipolar sections 14 and 15 and driver sections 16 and 17. Before going into their description, a two-phase excitation driving method for the stepping motor 18 will be described referring to FIGS. 5 and 6. There are four conductive statuses for the stepping motor 18, hereinafter respectively referred to as energizing steps 1 to 4.

Referring to FIG. 5, the energizing step 1 is when a current flows from A to $\overline{A}$ and from B to $\overline{B}$; a stator 91 and a rotor 90 have the positional relationship as shown in FIG. 6. The rotor 90 is connected to the drive shaft of the aperture blades. Changing the energizing step from 1 to 2, 3, 4, 1 and so forth changes the exciting status of the stator 91 so that the rotor 90 rotates 90° clockwise for each change as shown in FIG. 6. In general, the rotor 90 of the stepping motor is rotated by an angle proportional to the total number of received step control pulses and has a rotational speed proportional to the number of pulses per second (PPS) or a pulse rate. The driving torque decreases as the pulse rate increases. In this embodiment, the four energizing steps are controlled by the lens CPU 13. Table 1 presented below shows the correlation between the levels of step control pulse signals AV1 to AV4 from the lens CPU 13 and the energizing steps 1 to 4.

TABLE 1

|        | AV1 | AV2 | AV3 | AV4 |
|--------|-----|-----|-----|-----|
| Step 1 | L   | H   | L   | H   |
| Step 2 | H   | L   | L   | H   |
| Step 3 | H   | L   | H   | L   |
| Step 4 | L   | H   | H   | L   |

The driving circuit of the stepping motor 19 will now be described with reference to Table 1 and FIG. 4. The control signals AV1 and AV2 serve to control the system of the phase A, while the control signals AV3 and AV4 serve to control the system of the phase B. To realize the energizing step 1, the control signals AV1 and AV3 are set at an "L" level. Therefore, a constant current source 31 in the bipolar section 14 and a constant current source 51 in the bipolar section 15 are activated, thus supplying base currents to transistors 37 and 57, respectively. In the system of the phase A, the base current forms a current path of the power source $V_E \rightarrow$ emitter of a transistor 70→base of the transistor 70→resistor 36→collector of a transistor 37→emitter of the transistor 37→resistor 38→base of a transistor 73→emitter of the transistor 73→ resistor 74→ground GND. Consequently, the transistors 70 and 73 are turned on, permitting an exciting current to flow to the point $\overline{A}$ from the point A. In the system of the phase B, similarly, the base current forms a current path of the power source $V_E \rightarrow$ emitter of a transistor 80→base of the transistor 80→resistor 56→collector of a transistor 57→emitter of the transistor 57→resistor 58→base of a transistor 83→ emitter of the transistor 83→resistor 84→ground GND. Consequently, the transistors 80 and 83 are turned on, permitting an exciting current to flow to the point B from the point $\overline{B}$. In the energizing step 3 contrary to the energizing step 1, the control signals AV2 and AV4 become an "L" level and the constant current sources 32 and 52 are activated. In the system of the phase A, a current path is formed through the transistor 39 and resistors 40 and 41 and the transistors 71 and 73 are turned on, thus permitting the exciting current to flow to the point A from the point $\overline{A}$. In the system of the phase B, a current path is formed through the transistor 59 and resistors 60 and 61 and the transistors 81 and 83 are turned on, thus permitting the exciting current to flow to the point B from the point $\overline{B}$.

The value of the exciting current flowing through each phase in the stepping motor is determined mostly by the source voltage $V_{EE}$ and the resistance of the coil (normal, several tens of Ω). In a camera using a battery as a power source, the value of the current flowing across the battery varies in accordance with the degree of the power consumption. For instance, provided that a battery which, when new, outputs a voltage of 7.4 V, is used until its output voltage becomes 4.5 V and that the resistance of the coil per phase is 20 Ω, the value of the current immediately after replacement of the battery is 7.4 V ÷ 20 Ω = 370 mA per phase and 740 mA for two phases. When the battery voltage decreases to 4.5 V, the value of that current is 4.5 V ÷ 20 Ω = 225 mA per phase and 450 mA for two phases. With respect to eh stepping motor operable by the exciting current of 450 mA for two phases, therefore, there is an excess current of 290 mA when the battery voltage is 7.4 V. To eliminate such a waste of power, this embodiment employs a feedback function for monitoring the exciting current to thereby permit the flow of only the minimum required current. Accordingly, resistors 74 and 84 are provided in the driver sections 16 and 17, respectively. These resistors have a resistance of about 0.2 Ω, and they, when the exciting current flows thereacross, causes a voltage drop accordingly. This voltage drop is Va in the system of the phase A and Vb in the system of the phase B. The feedback function of the system of the phase A will now be described.

The detected voltage Va is input to a non-inverting input terminal (+) of an operational amplifier 30 of the bipolar section 14. An inverting input terminal (−) of the operational amplifier 30 is supplied with a reference voltage which is obtained by voltage-dividing the voltage $V_{CC}$ by the resistors 42 and 43. The value of the reference voltage is the value of the voltage Va generated when a current of 225 mA flows across the resistor 74 (i.e., 0.2 Ω × 225 mA = 0.45 V). With Va less than 0.45 V, the input to the (−) terminal of the operational amplifier 30 is greater than that to the (+) terminal, so that the transistor 33 coupled to the output of the operational amplifier 30 is rendered off. On the other hand, with Va equal to or greater than 0.45 V, the transistor 33 is turned on. The transistor 33 when turned on permits the base current of the transistor 37 or 39 to draw via the diode 34 or 35, thus reducing the collector current of the transistor 37 or 39, i.e., the base current for turning two pairs of transistors of the driver section 16 on. As a result, the exciting current is limited so as to prevent a waste current from flowing when the source voltage is large. The same can apply to the system of the phase B. The feedback circuit for the system of the phase B comprises resistors 62 and 63 for providing a reference voltage of 0.45 V, an operational amplifier 50 for comparing the reference voltage with Vb, a transistor 53 which can be turned ON or OFF by the output of the operational amplifier 50, and diodes 54 and 55 for permitting the base current of the transistor 57 or 59 to draw through the transistor 53.

Figure 7:
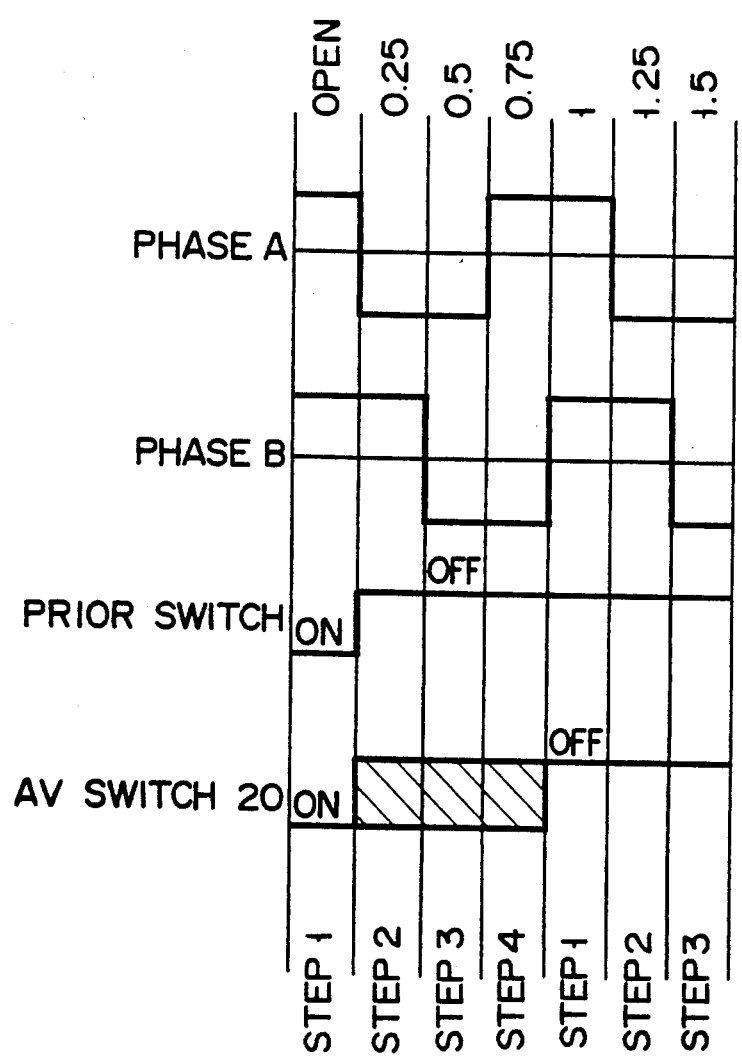
FIG. 7 illustrates the operation of a full-open detecting switch.

A description will now be given of the full-open detecting switch 20 detecting a full-open, which serves as detecting means to detect a specific aperture value. After the completion of photographing one frame of a picture, the aperture blades 19 are set back to the full-open status from the stop-down status. When the status of the open detecting switch 20 varies, the driving the stepping motor 18 is stopped. Here, t is assumed that the switch 20 is adjusted in such a manner that the aperture can be changed 0.25 stage for each energizing step of the stepping motor and the aperture position comes to the full-open position when the energizing step 1 is realized. A conventional open detecting switch should be accurately adjusted in such a way that it is turned on in the full-open state and is turned off when the aperture is stopped down by one energizing step (0.25 stage), as shown in FIG. 7. Misadjusting of the switch would disable the switch to detect the full-open state or would result in misjudgment that the 0.25-stopped-down position is discriminated to be full-open. According to this embodiment, however, the diaphragm mechanism is adjusted in such a way that the aperture position comes to the open position when the energizing step 1 is realized, and the status of the switch is discriminated only in the energizing step 1. Accordingly, the open detecting switch 20 has only to be turned off at any point between 0.25- to 0.75-stopped down position and accurate adjustment thereof is unnecessary. The output of this switch 20 is input to the lens CPU 13.

The following describes how to deal with a step-out phenomenon. Since the diaphragm mechanism for a camera needs to be driven at a high speed, the stepping motor 18 should be rotated at a high speed. As the driving torque at the time of high-speed rotation is small, as described above, there is no sufficient torque to start to rotate the rotor 90 and the aperture blades 19 connected to the rotor 90. The stepping motor 18 is therefore controlled in such a manner that a low-speed, high torque driving obtained by setting the pulse rate of the step control pulse in a low rate is effected at the time the rotor is started to rotate and the movement of the rotor 90 is made to follow the change in the excitation status of the stator 91 by gradually increasing the pulse rate after actuation of the rotor 90. This is called a slow-up control.

In a case of a continuous photographing of 3.5 to 5 frames per second, the aperture is fully opened and closed to a given value for each photograph, thus making the consumed current for aperture driving significantly large. This gradually reduces the battery voltage so that the exciting current for executing the aforementioned high-speed driving cannot be supplied in some case. As a result, the stepping motor 18 for aperture driving steps out. When the step-out phenomenon occurs during a continuous photographing operation, all the pictures photographed thereafter is likely to suffer abnormal exposure so that a photographer should waste an expensive film and lose a good shutter chance. In this embodiment, therefore, upon detection of the step-out phenomenon, the slow-up control is stopped and a low-speed and high-torque driving is executed at a constant low pulse rate to return the aperture to the full-open position. The pulse rate for a slow-up control for stop-down of the aperture thereafter is set lower than the pulse rate set before occurrence of the step-out phenomenon to execute the control at a low-speed and high driving torque, thereby preventing a re-occurrence of the step-out phenomenon.

Figure 8:
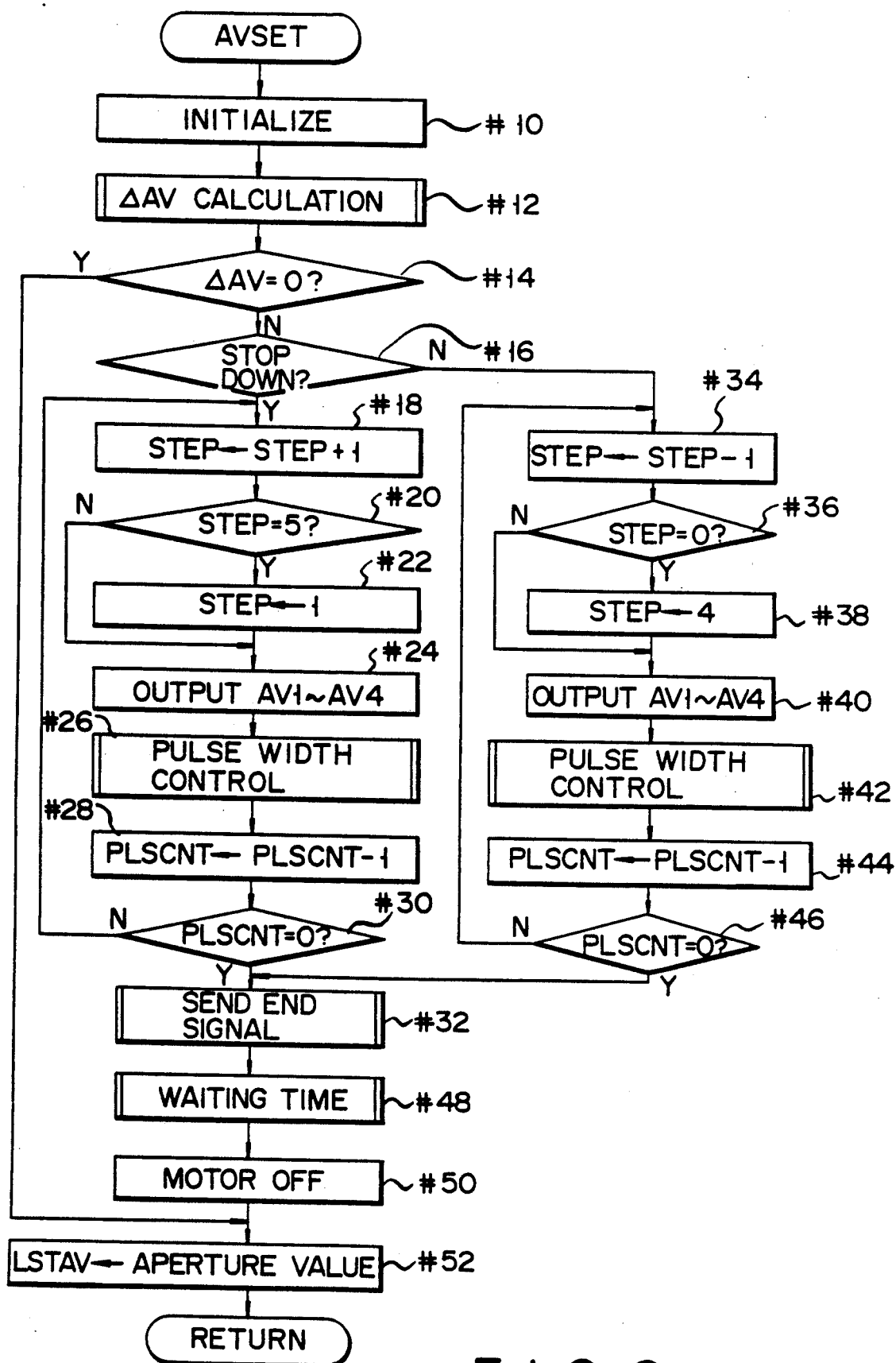

The operation of the embodiment having the above structure will now be described along the flowcharts of the lens CPU 13 shown in FIGS. 8 through 11. FIG. 8 is a flowchart of a subroutine "AVSET". This subroutine sets the diaphragm to the set aperture value supplied from the body CPU 10 for exposure control by controlling the stepping motor 18; this routine is executed prior to photographing of one frame. When the subroutine "AVSET" is called, initialization is executed in step #10. In this step flags and registers used in executing the control are cleared except registers STEP and LSTQV and a flag ABNML-F, and the initial setting of the individual input/output ports is done. Those registers and flag which will not be cleared in step #10 will be described later.

In step #12 a subroutine "ΔAV CALCULATION" is executed. In this step the number of energizing steps and the rotational direction of the stepping motor 18 for realizing the set aperture value specified by the body CPU 10 are obtained. The number of energizing steps is obtained by converting ΔAv into the number of steps of the stepping motor 18, where ΔAV is the difference between the set aperture value specified by the body CPU 10 and the aperture value of the register LSTAV which stores the aperture value realized by the previous aperture control (normally, the full-open aperture value and at a time of pre-view, the aperture value of the time of pre-view). The obtained number of steps is stored in a register PLSCNT. The rotational direction is a step-down direction when the set aperture value > the value of the register LSTAV. The rotational direction is an open direction when the set aperture value < the value of the register LSTAV. When the set aperture value = the value of the register LSTAV, the number of the energizing steps is 0 and the rotational direction in this case is not settled. The pre-viewing operation is possible by permitting the aperture value realized by the previous aperture control to be stored int eh register LSTAV.

It is then determined in step #14 whether or not ΔAV is 0. If the number of the energizing steps of ΔAV is 0, the present aperture value is the set aperture value and the set aperture value is stored in the register LSTAV in step #52 without driving the stepping motor 18. Thereafter, the flow returns to the previous routine. If ΔAV is not 0, it is determined in step #16 whether the rotational direction is the stop-down direction or open direction. In the former case, the value of the register STEP which represents the number of energized steps of the stepping motor 18 is increased by one and the resulting value is stored again in the register STEP in step #18. In step #20 it is determined whether or not the value of the register STEP is 5. If it is 5, the value of the register STEP is changed to 1 in step #22. This operation is for changing the energizing step from 1 to 2, 3, 3, 1 and so on because the rotational direction is the stop-down direction. In step #24 the step control signals AV1 to AV4 having the levels corresponding to the energizing step, as shown in Table 1, are output.

Figure 11:
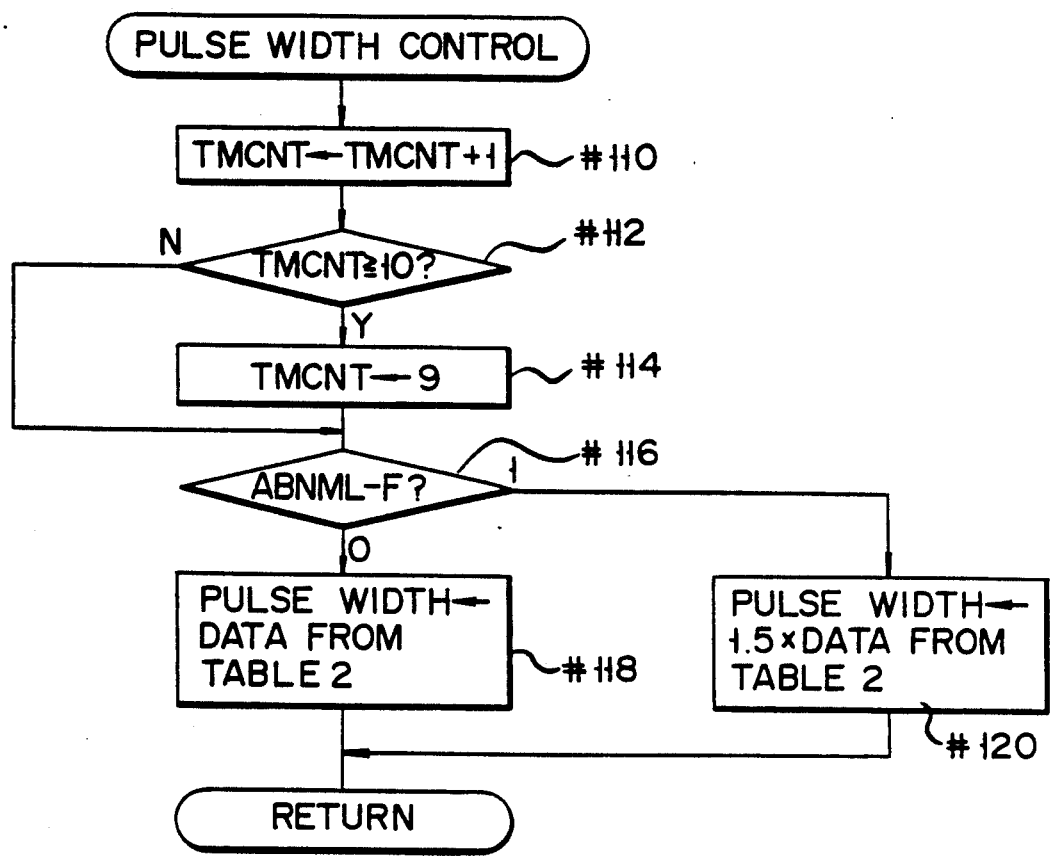
Figure 12:
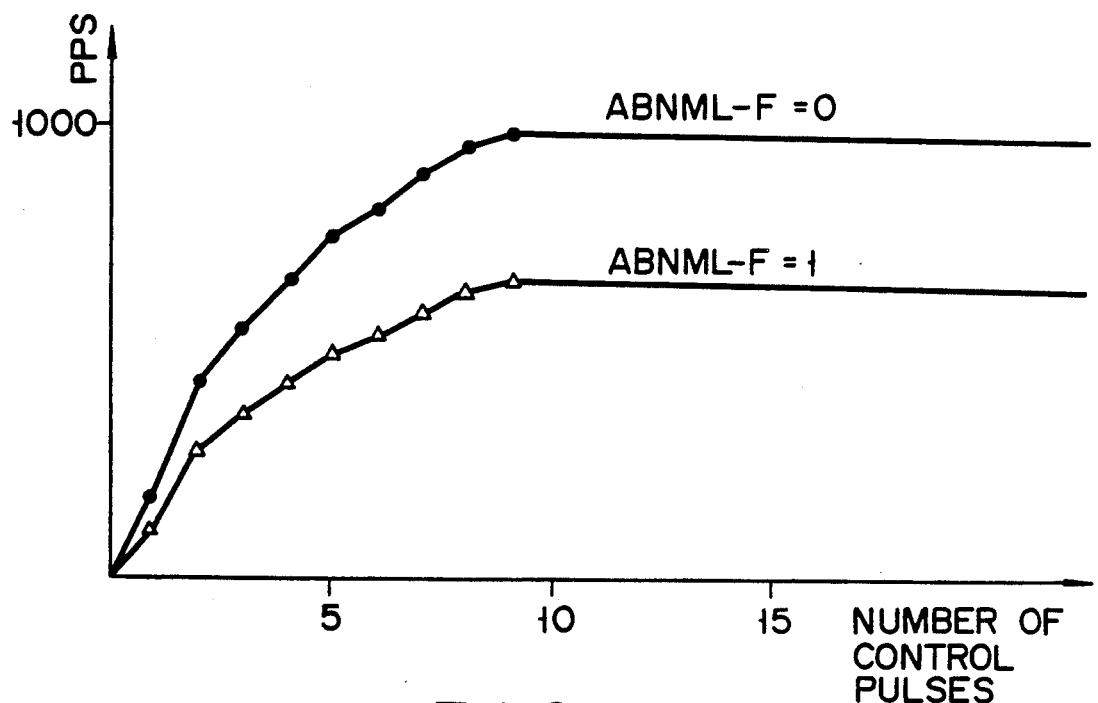
FIG. 12 illustrates a pulse rate control characteristic.

In step #26 a subroutine "PULSE WIDTH CONTROL" is executed to determine the duration of the energizing step (pulse width of the step control signal). The flowchart for this subroutine is illustrated in FIG. 11. First, in step #110, one is added to the value of a register TMCNT and the resultant value is stored again in this register. In the subsequent step #112, it is determined whether or not the value of the register TMCNT is equal to or greater than 10. If the value of the register TMCNT is equal to or greater than 10, it is changed to 9 in step #114. In step #116 it is determined whether or not the flag ABNML-F indicating a step-out status is set. If the flag ABNML-F is not set, the levels of the control signals AV1 to AV4 are held by the time of the pulse width read out from Table 2, presented below, in accordance with the value of the register TMCNT, thereby permitting the energizing step to continue for the pulse width. If the flag ABNML-F is set, the levels of the control signals AV1 to AV4 are held by the time obtained by multiplying the pulse width read out from Table 2 is accordance with the value of the register TMCNT by 1.5, thereby permitting the energizing step to continue for the time longer than the pulse width of Table 2. Taking a long continuing duration of the energizing step is for effecting the low-speed, high-torque driving in order to prevent re-occurrence of the step-out phenomenon. FIG. 12 illustrates the relationship between the number of pulses of the control signal sent to the stepping motor and the pulse rate. Table 2 shows the relationship between the value of the register TMCNT and the pulse width. It should be understood from FIG. 12 and Table 2 that as the pulse width becomes narrower with elapse of the time from the beginning of the driving operation, the pulse rate increases and the driving speed increases with elapse of the time. The slow-up control is executed by effecting a low-speed, high-torque driving at a time the stepping motor is activated and gradually increasing the pulse rate thereafter.

TABLE 2

| TMCNT | Pulse Width (ms) |
| --- | --- |
| 1 | 5.66 |
| 2 | 2.34 |
| 3 | 1.80 |
| 4 | 1.51 |
| 5 | 1.33 |
| 6 | 1.21 |
| 7 | 1.11 |
| 8 | 1.03 |
| 9 | 1.00 |

Instead of multiplying the pulse width read out from Table 2 in step #120, the following Table 3 which shows such multiplied values may be prepared in advance and either Table 2 or Table 3 can be selected in accordance with the content of the flag ABNML-F.

TABLE 3

| TMCNT | Pulse Width (ms) |
| --- | --- |
| 1 | 8.490 |
| 2 | 3.510 |
| 3 | 2.700 |
| 4 | 2.265 |
| 5 | 1.995 |
| 6 | 1.815 |
| 7 | 1.665 |
| 8 | 1.545 |
| 9 | 1.500 |

When the subroutine "PULSE WIDTH CONTROL" is completed in step #26 in FIG. 8, the value of the register PLSCNT which stores the number of driving pulses is decremented by one and the resultant value is stored again in this register. In step #30, it is determined whether or not the value of the register PLSCNT is 0. If it is not 0, the flow returns to step #18 where the value of the register STEP is incremented by one and the resultant value is stored again in this register. Since the register PLSCNT holds the number of energizing steps obtained by the subroutine "ΔAV CALCULATION," when the value of this register is decremented by one every time a process for one energizing step is completed, the resultant value of the register PLSCNT represents the number of remaining energizing steps. The loop is repeated until the value of the register PLSCNT becomes 0, thus the stepping motor 18 is continuously rotated and the aperture blades 19 are driven until the aperture value becomes the specified aperture value.

If the rotational direction is determined to be the open direction in step #16, the similar control for driving the stepping motor in the stop-down direction is executed in steps #34 to #46, except that the value of the register STEP is decremented by one in step #34 and the value of the register STEP is changed to 4 in step #38 when ti becomes 0.

When the value of the register PLSCNT becomes 0, a subroutine "SEND END SIGNAL" is executed in step #32 in order to inform the body CPU 10 of completion of the stop-down operation. This permits execution of the next operation by the body CPU 10 during a time in which the aperture bound is absorbed, thus shortening a so-called time lag between the beginning of the stop-down and the beginning of exposure. When the driving is completed, the stepping motor 18 rotating at high speed is abruptly stopped without undergoing deceleration in this embodiment. In other words, the energizing pattern (levels of control signals AV1 to AV4) is fixed without performing a slow-down control when the rotor 90 reaches the target position and a subroutine "WAITING TIME" is executed in step #48. Here, a waiting time of about 10 msec. is elapsed. During this 10 msec., the bound of the rotor 90 is absorbed. Power supply to the stepping motor 18 is cut off in step #50, and the specified aperture value is stored int eh register LSTAV in step #52. This completes the subroutine "AVSET" and the flow returns to the previous routine. Normally, a subroutine for exposure will be executed thereafter.

Figure 9:
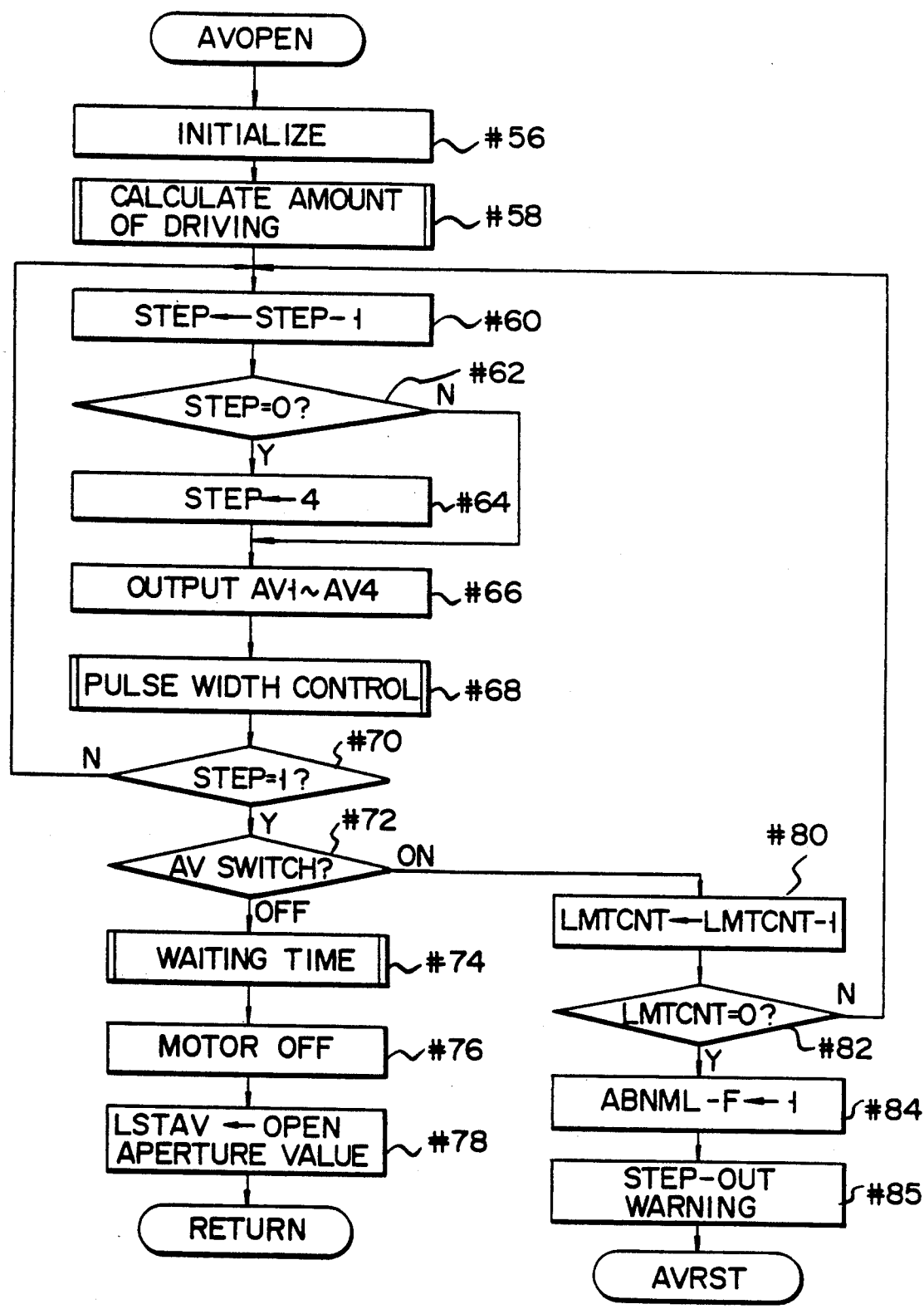

FIG. 9 illustrates a flowchart of a subroutine "AVOPEN," which fully opens the aperture closed in the subroutine "AVSET" by driving the stepping motor 18 so that the aperture value is set to a full-open value. The subroutine "AVOPEN" is normally executed after photographing a picture (execution of the exposure subroutine). When the subroutine "AVOPEN" is called, initialization is effected in step #56. In this step registers and flags used in executing the control are cleared, except registers STEP and LSTAV since these two store data about the present aperture value as described earlier.

In step #58 a subroutine "CALCULATE AMOUNT OF DRIVING" is executed. In this step, the difference between the value of the register LSTAV or the present aperture value and the full-open aperture value is obtained and is converted into the number of steps, it is then calculated how many times the energizing step 1 is performed between the present position and the full-open position, and the calculated value is stored in the register LMTCNT.

In step #60 the value of the register STEP storing an energizing step corresponding to the present aperture value is decremented by one, and the resultant value is stored again in this register. In step #62 it is determined whether or not the value of the register STEP is 0. If it is 0, the value of the register STEP is changed to 4 in step #64. Since this subroutine is for driving the diaphragm until it is in a full-open status, the rotational direction is the open direction and the energizing step is changed from 4 to 3, 2, 1, 4 and so on.

In step #66 the levels of the control signals AV1 to AV4 corresponding to the value of the register STEP are obtained referring to Table 1, and the signals AV1 to AV4 are sent to the driving circuit 27 for the stepping motor. As in the case of the subroutine "AVSET," the subroutine "PULSE WIDTH CONTROL" is executed to control the continuing duration of the energizing step in step #68.

IN step #70 it is determined whether or not the value of the register STEP is 1. If it is not 1, the flow returns to step #60. If this value is 1, the status of the open detecting switch 20 is checked in step #72. This switch 20 is turned off when the aperture is fully open and its output signal becomes an "H" level. In this manner, completion of the driving is checked only when the value of the register STEP is 1. Accordingly, the open detecting switch 20 requires no accurate adjustment as shown in FIG. 7. When the switch 20 is off and its output is at an "H" level, it is a case where the open aperture is achieved without causing a step-out phenomenon, so that a process for terminating the driving is executed. In other words, since the open detecting switch 20 in the energizing step 1 is surely turned off, the subroutine "WAITING TIME" is executed in step #74 and the levels of the control signals AV1 to AV4 are held for a time in which the rotor becomes stable. Power supply to the stepping motor 18 is cut off in step #76 and the present aperture value or the full-open aperture value is stored in the register LSTAV in step #78. At this time, 1 is stored in the register STEP. Through the above operation, the aperture blades 19 becomes a full-open status and data about the aperture value in full-open status is stored in the registers LSTAV and STEP. The flow returns to the previous routine thereafter.

In a case the open detecting switch 20 is on and its output has an "L" level in step #72, the value of the register LMTCNT is decremented by 1 and the resultant value is stored again in this register in step #80. It is determined in step #82 whether or not the value of the LMTCNT is 0. If it is not 0, the flow returns to step #60. If this value is 0, which means that full-open aperture is not realized even when the number of energizing steps exceeds the number of steps, obtained in step #58 for providing the full-open status, it can be judged that the stepping motor is in step-out status. In the subsequent step #84, the flag ABNML-F which represents a step-out status, is set. In step #85 a step-out warning signal is sent to the body CPU 10 and the flow advances to a subroutine "AVRST" where the stepping motor is driven at a low speed and high torque as well as at a constant pulse rate until the full-open aperture status is surely achieved. Since the driving of the aperture blades is changed to a low-speed, high-torque driving after detection of a step-out phenomenon as described above, a step-out warning signal is sent to the body CPU 10 in step #85 to inform a photographer in advance that the driving time becomes longer and the occurrence of a step-out phenomenon is displayed on the display 12a. Accordingly, the photographer can replace the battery with a new one as needed.

Figure 10:
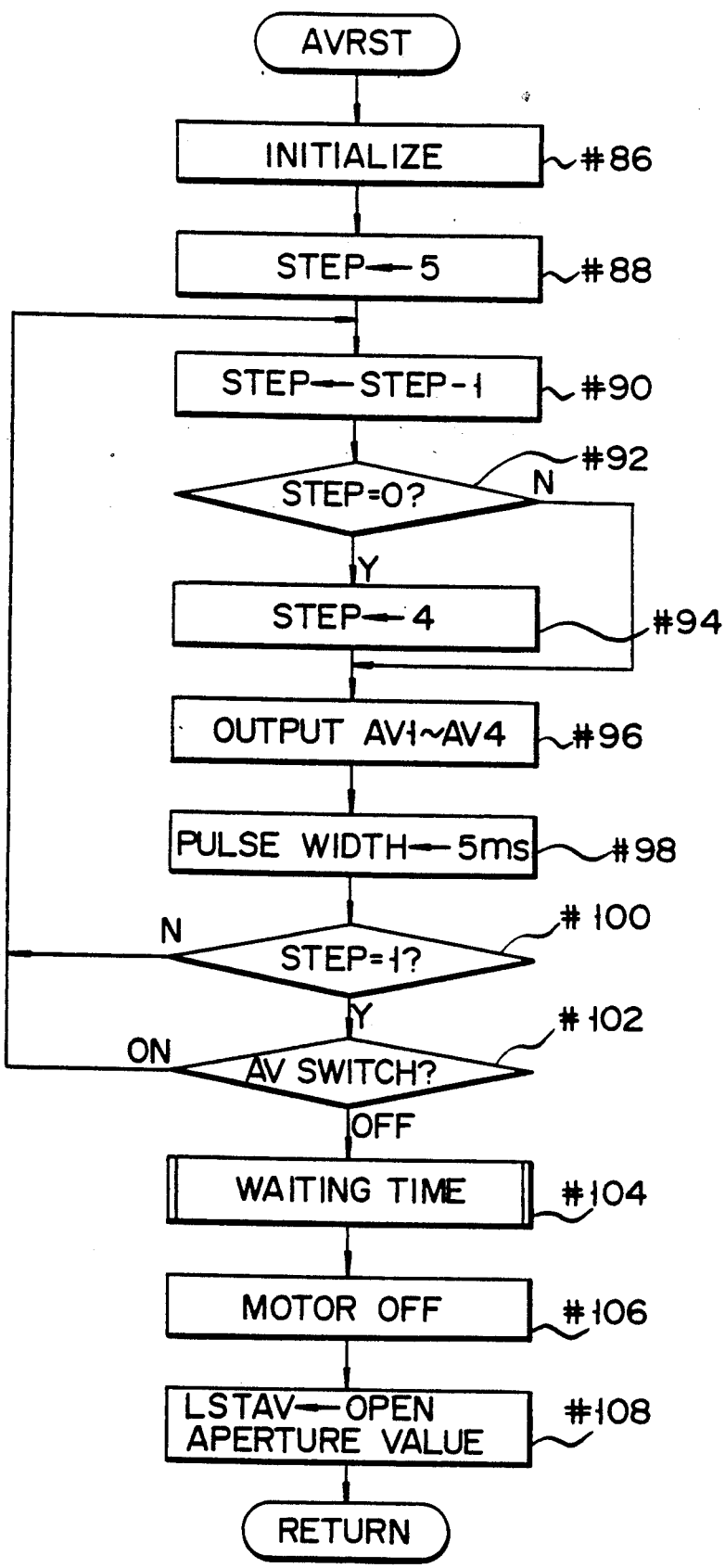

FIG. 10 is a flowchart for the subroutine "AVRST," which surely sets the aperture blades 19 in whatever state it is, to the full-open status. This subroutine will be called when the status of the aperture blades 19 is not clear as in the case where power is supplied or the lens is mounted to the apparatus, or when a step-out phenomenon is detected in the subroutine "AVOPEN" and the aperture value is not return to the full-open aperture value without increasing the driving torque. In the first step #86, initialization is performed to all the registers used for the control and all the flags except the flag ABNML-F are cleared. The energizing step is executed for 5 msec. per step sequentially from the step 4 in the order of 4→3→2→1→4→.... The time for execution of each energizing step is set to be constant (5 msec.) without employing the subroutine "PULSE WIDTH CONTROL" in order to set the driving rate at a low level and increase the driving torque so that the rotor 90 wherever it is can surely follow a change in the excitation steps of the stator 91.

When it is determined in step #100 whether the value of the register STEP is 1, the flow advances to step #102 where the status of the open detecting switch 20 is checked. If the output level of the switch 20 is "H", the switch is turned off and it can be judged that the aperture blades are in the full-open status. Then, a process for terminating the driving is executed in steps #104 to #108. If the output level of the switch 20 is "L", the flow returns to step #90. The flag ABNML-F representing the step-out status is held until the power source of the lens CPU 13 is turned off. When this power source is activated again, the flag will be cleared in the initializing step. Even if, after detection of a step-out phenomenon, the aperture is reset to be in a full-open status by the subroutine "AVRST" and the stepping motor is recovered to the normal status from the step-out status, therefore, the driving torque for the stepping motor for the subsequent aperture driving is kept at a high level.

As described above the present invention can provide a diaphragm control apparatus for use in a camera using a stepping motor, which can detect a step-out phenomenon of the stepping motor with a simple structure, forcibly reset a diaphragm mechanism to the initial status for recovery from the step-out status after occurrence of the step-out phenomenon, and prevent re-occurrence of a step-out phenomenon by increasing the driving torque of the stepping motor in the subsequent driving operation, thereby minimizing an influence of the step-out phenomenon on a picture taken.

It should be understood that the present invention is in no way restricted to the above-described particular embodiments, but may be modified in various manners within the scope and spirit of the invention. For instance, although a specific aperture value for discriminating a step-out status is a full-open aperture and the step-out status is detected by an open detecting switch in the foregoing description, such a step-out status may also be properly discriminated using an arbitrary aperture value if an aperture encoder for detecting the absolute value of an aperture value is provided.

What is claimed is:

1. A diaphragm control apparatus of a camera, comprising:
    a diaphragm mechanism for adjusting an intensity of light reaching a film;
    a stepping motor for driving said diaphragm mechanism;
    means for calculating an amount of driving of said stepping motor necessary to fully open said diaphragm mechanism;
    full-open detecting means for detecting that said diaphragm mechanism is fully opened;
    step-out detecting means for detecting a step-out status of said stepping motor if said full-open detecting means does not detect said diaphragm mechanism is fully opened after said stepping motor is driven by the amount of driving obtained by said calculating means; and
    driving means for determining a drive mode for said stepping motor based on an output of said step-out detecting means and driving said stepping motor in accordance with the drive mode.

2. The apparatus according to claim 1, wherein said driving means includes means for changing a driving torque of said stepping motor in accordance with whether or not said step-out detecting means detects the step-out status.

3. The apparatus according to claim 2, wherein said driving means includes means for setting a driving speed of said stepping motor, upon detection of the step-out status, at a speed lower than a driving speed set before detection of the step-out status.

4. The apparatus according to claim 1, wherein said full-open detecting means includes a switch operative when said diaphragm mechanism is fully opened.

5. The apparatus according to claim 4, wherein said driving means includes means for, when the step-out status is detected, forcibly fully opening said diaphragm mechanism by setting a driving speed of said stepping motor, until said switch is operated, at a speed lower than a driving speed set before detection of the step-out status.

6. The apparatus according to claim 5, wherein said driving means includes mans for setting a driving speed of said stepping motor, until power is turned off after said diaphragm mechanism is returned to a full-open status, at a speed lower than a driving speed set before detection of the step-out status.

7. The apparatus according to claim 1, wherein said driving means includes means for gradually increasing a driving speed of said stepping motor as time elapses from beginning of driving of said stepping motor.

8. A diaphragm control apparatus of a camera, comprising:
    means for measuring brightness of an object to be photographed;
    means for setting photograph data including at least a film sensitivity;
    aperture blades for changing an intensity of light reaching a film;
    a stepping motor for opening and closing said aperture blades;
    driving means for supplying a drive signal to said stepping motor;
    full-open detecting means for detecting that said aperture blades are fully opened; and
    a central processing unit (CPU) for receiving the brightness from said measuring means and the photograph data from said setting means, calculating an aperture value for realizing a proper intensity of exposure light and outputting a first digital control signal to said driving means for driving said stepping motor at a predetermined torque, said CPU determining that said stepping motor is in a step-out status if said full-open detecting means does not detect said aperture blades are fully opened after said CPU outputs a second digital control signal necessary to fully open said aperture blades, and outputting a third digital control signal for setting a driving torque of said stepping motor higher than the predetermined torque.

9. The apparatus according to claim 8, wherein said CPU outputs the third digital control signal until said full-open detecting means detects said aperture blades are fully opened after detection of the step-out status.

10. The apparatus according to claim 9, wherein said CPU outputs the third digital control signal until a power source is turned off after said aperture blades are recovered to a full-open status.

11. The apparatus according to claim 8, wherein said CPU increases the driving torque by reducing a driving speed of said stepping motor.

12. The apparatus according to claim 8, wherein said CPU includes table means for storing pulse rates which gradually increase in accordance with elapse of a time from the beginning of driving said stepping motor, and means for outputting the first digital control signal in accordance with the pulse rates read out from said table means to vary a driving speed of said stepping motor.

13. The apparatus according to claim 12, wherein said table means comprises first and second tables for storing different pulse rates and said CPU selects one of said first and second tables in accordance with whether or not said step-out detecting means detects the step-out status, then reads out the pulse rates from said selected table.

14. A diaphragm control apparatus according to claim 12, wherein said CPU includes means for multiplying the pulse rates read from said table means by a constant, and either the pulse rates read out from said table means or those obtained by said multiplying means in accordance with whether or not said step-out detecting means detects the step-out status.

15. A diaphragm control method for use in a camera having a diaphragm mechanism for adjusting an intensity of light reaching a film, a stepping motor for driving said diaphragm mechanism and means for detecting that said diaphragm mechanism is fully opened, said method comprising the steps of:
    determining an amount of driving of said stepping motor necessary to fully open said diaphragm mechanism;
    driving said stepping motor by a predetermined torque in accordance with the amount of driving determined;
    determining whether or not said detecting means detects said diaphragm mechanism is fully opened after said stepping motor is driven; and
    detecting that said stepping motor is in a step-out status if said detecting means does not detects said diaphragm mechanism is fully opened and upon detection of the step-out status setting a driving torque of said stepping motor at a torque higher than the predetermined torque.

16. The method according to claim 15, wherein said step-out status detecting step comprises the substep of setting a driving speed of said stepping motor at a speed lower than a driving speed set before detection of the step-out status to thereby increase the driving torque upon detection of the step-out status.

17. The method according to claim 15, further comprising the steps of:
    driving said stepping motor at a speed lower than the driving speed set before detection of the step-out status, after detection of the step-out status; and
    continuing the low-speed driving until said detecting means detects said diaphragm mechanism is fully opened.

18. The method according to claim 17, further comprising the steps of:
    driving said stepping motor at the low speed until the diaphragm mechanism is driven to a given aperture value after detection of the fully-open status in a case where said stepping motor is driven again; and
    continuing the low-speed driving thereafter until a power source is turned off.

19. A camera comprising:
    a camera body which comprises:
    means for measuring brightness of an object to be photographed;
    means for setting photograph data including at least a film sensitivity; and
    a first central processing unit (CPU) for receiving the brightness from said measuring means, the photograph data from said setting means and a full-open aperture value of a lens and calculating an aperture value for realizing a proper amount of exposure light; and
    a photographing lens connected to said camera body which comprises:
    aperture blades for varying an intensity of light reaching a film;
    a stepping motor for opening and closing said aperture blades;
    driving means for supplying a drive signal to said stepping motor;
    open-status detecting means for detecting that an aperture value of said aperture blades is a given aperture value; and
    a second CPU for receiving the aperture value calculated by said first CPU and outputting to said driving means a first digital control signal for driving said stepping motor at a predetermined torque, said second CPU determining that said stepping motor is in a step-out status if said open-status detecting means does not detect the aperture value of said aperture blade is the given aperture value after said second CPU outputs to said driving means a second digital control signal for opening said aperture blades to the full-open aperture value, and outputting a third digital control signal for setting a driving torque of said stepping motor at a torque higher than the predetermined torque.

20. A diaphragm control apparatus of a camera, comprising:
   a stepping motor for driving a diaphragm mechanism;
   means for positioning said diaphragm mechanism at an initial aperture status;
   means for driving said stepping motor at a predetermined torque to move the diaphragm mechanism away from said initial aperture status;
   step-out detecting means for detecting a step-out status of said stepping motor and outputting an alarm signal; and
   means for supplying a drive control signal to said driving means for setting a drive torque of said stepping motor at a torque higher than the predetermined torque and for forcibly resetting said diaphragm mechanism to said initial aperture status when said alarm signal is output.

21. A diaphragm control apparatus of a camera, comprising:
   a stepping motor for driving a diaphragm mechanism;
   means for positioning said diaphragm mechanism at an initial aperture status;
   means for driving said stepping motor at a predetermined torque to move the diaphragm mechanism away from said initial aperture status;
   step-out detecting means for detecting a step-out status of said stepping motor and outputting an alarm signal; and
   means for supplying a drive control signal to said driving means for setting a drive torque of said stepping motor at a torque higher than the predetermined torque when said alarm signal is output to thereby forcibly reset said diaphragm mechanism to said initial aperture status;
   wherein said step-out detecting means comprises:
   means for detecting a full-open status of said diaphragm mechanism and outputting an open aperture signal upon detection of the full-open status; and
   means for outputting said alarm signal if said open aperture signal is not output after a predetermined number of drive pulses necessary to drive said stepping motor up to a full-open value is supplied to said stepping motor.

22. A diaphragm control apparatus of a camera driving a diaphragm mechanism including aperture blades by a stepping motor, said apparatus comprising:
   means for placing said diaphragm mechanism at an initial position;
   first driving means for driving said stepping motor at a first torque to move the diaphragm mechanism away from said initial position;
   second driving means for driving said stepping motor at a second torque higher than the first torque;
   selecting means for selectively energizing said first or second driving means; and
   resetting means for causing said selecting means to energize said second driving means to forcibly reset said diaphragm mechanism to said initial position when the step-out status of said stepping motor is detected while said stepping motor is being driven by said first driving means energized by said selecting means.

23. The apparatus according to claim 22, wherein said selecting means comprises:
   memory means for storing data about said stepping motor being in the step-out status; and
   means for selecting said first driving means before detection of the step-out status and said second driving means after detection of the step-out status in accordance with a content of said memory means.

24. The apparatus according to claim 23, wherein said content of said memory means is held until a power source of said aperture control apparatus is turned off.

25. A diaphragm control apparatus of a camera driving a diaphragm mechanism including aperture blades by a stepping motor, said apparatus comprising:
   step-out detecting means for detecting a step-out status of said stepping motor and outputting an alarm signal upon detection of the step-out status, the step-out detecting means comprising full-open detecting means for detecting that said diaphragm mechanism is fully opened, and means for detecting the step-out status if the full-open detecting means doe snot detect said diaphragm mechanism is fully opened after said stepping motor is driven by an amount necessary to fully open said diaphragm mechanism; and
   drive control means having a first drive mode for driving said stepping motor at a predetermined torque and a second drive mode for driving said stepping motor at a torque higher than the predetermined torque, for driving said stepping motor in said first drive mode before output of said alarm signal and driving said stepping motor in said second drive mode after output of said alarm signal.

26. The apparatus according to claim 25, wherein said drive control means comprises:
   means for storing a drive signal for said first drive mode; and
   means for storing a drive signal for said second drive mode.

27. The apparatus according to claim 25, wherein said drive control means comprises:
   means for storing a drive signal for said first drive mode; and
   means for subjecting the drive signal stored for said first drive mode to an arithmetic operation to obtain a drive signal for the second drive mode.

* * * * *